US010789930B2

(12) United States Patent
Takahashi et al.

(10) Patent No.: US 10,789,930 B2
(45) Date of Patent: Sep. 29, 2020

(54) STRUCTURE BODY, SOUND ABSORBING MATERIAL, SOUND INSULATING WALL MATERIAL, AND MANUFACTURING METHOD OF STRUCTURE BODY

(71) Applicant: SHOWA DENKO K.K., Tokyo (JP)

(72) Inventors: Nobuyuki Takahashi, Tokyo (JP); Ryujin Ishiuchi, Tokyo (JP); Shotaro Itami, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 409 days.

(21) Appl. No.: 15/531,477

(22) PCT Filed: Dec. 11, 2015

(86) PCT No.: PCT/JP2015/085429
§ 371 (c)(1),
(2) Date: May 30, 2017

(87) PCT Pub. No.: WO2016/093369
PCT Pub. Date: Jun. 16, 2016

(65) Prior Publication Data

US 2017/0263233 A1 Sep. 14, 2017

(30) Foreign Application Priority Data

Dec. 12, 2014 (JP) ................................ 2014-251567

(51) Int. Cl.

| | |
|---|---|
| ***G10K 11/165*** | (2006.01) |
| ***E04B 1/86*** | (2006.01) |
| ***E01F 8/00*** | (2006.01) |
| *G10K 11/16* | (2006.01) |
| *E04B 9/04* | (2006.01) |
| *B29C 39/00* | (2006.01) |
| *B29K 31/00* | (2006.01) |
| *B29K 67/00* | (2006.01) |
| *B29K 509/00* | (2006.01) |

(52) U.S. Cl.
CPC .......... *G10K 11/165* (2013.01); *E01F 8/0005* (2013.01); *E01F 8/0029* (2013.01); *E04B 1/86* (2013.01); *B29C 39/003* (2013.01); *B29K 2031/00* (2013.01); *B29K 2067/06* (2013.01); *B29K 2509/14* (2013.01); *B29K 2995/0002* (2013.01)

(58) Field of Classification Search
CPC .. E01F 8/00; E01F 8/0029; E04B 1/86; E04B 1/98; E04B 9/04; E04C 2/26; E04C 2/34; G10K 11/16; G10K 11/165; E01B 19/00; E01B 19/003
See application file for complete search history.

(56) References Cited

U.S. PATENT DOCUMENTS 4,049,874 A * 9/1977 Aoyama ............... B29C 67/242 428/451
4,713,277 A * 12/1987 Akiyama .................. C22C 1/08 164/79
6,664,205 B2 * 12/2003 Oda ........................ C04B 28/26 252/62
9,266,778 B2 * 2/2016 Yeung ..................... C04B 28/02
9,631,766 B2 * 4/2017 Bienerth ................. C04B 26/04
9,670,665 B2 * 6/2017 Kipp ....................... C04B 28/26
2005/0158536 A1 * 7/2005 Tokoro .................. B29C 44/445 428/316.6
2009/0004459 A1 * 1/2009 Kipp ....................... C04B 28/26 428/318.4
2014/0262603 A1 * 9/2014 Johnson .................... E04B 1/86 181/211

FOREIGN PATENT DOCUMENTS

| | | | | |
|---|---|---|---|---|
| AT | 363 507 B | 8/1981 | | |
| CN | 1448464 A | 10/2003 | | |
| CN | 101497509 A | 8/2009 | | |
| DE | 20 2008 016 807 U1 | 6/2010 | | |
| EP | 0399514 A1 * | 11/1990 | ............ | C04B 26/14 |
| EP | 2 372 024 A2 | 10/2011 | | |
| JP | 48-40838 A | 6/1973 | | |
| JP | 48-47853 U | 6/1973 | | |
| JP | 04-238958 A | 8/1992 | | |
| JP | 5-204385 A | 8/1993 | | |
| JP | 06-191357 A | 7/1994 | | |
| JP | 10-231566 A | 9/1998 | | |
| JP | 10-331286 A | 12/1998 | | |
| JP | 2002-088941 A | 3/2002 | | |
| JP | 2003-292352 A | 10/2003 | | |
| JP | 2007-291834 A | 11/2007 | | |
| JP | 5382867 B2 | 1/2014 | | |
| JP | 2014-159713 A | 9/2014 | | |
| KR | 10-1244904 B1 | 3/2013 | | |
| WO | 94/24381 A1 | 10/1994 | | |
| WO | WO-9424381 A1 * | 10/1994 | .............. | E04B 1/86 |

(Continued)

OTHER PUBLICATIONS

International Search Report for PCT/JP2015/085429 dated Mar. 18, 2016 [PCT/ISA/210].
Communication dated Jun. 5, 2018, issued by the Japan Patent Office in corresponding Japanese Application No. 2014-251567.
Decision of Rejection dated Feb. 26, 2019 issued by the Japanese Patent Office in counterpart application No. 2014-251567.
Communication dated Oct. 11, 2018 from the European Patent Office in counterpart Application No. 15 826 195.8.
Communication dated Oct. 16, 2018 from the Japanese Patent Office in counterpart Application No. 2014-251567.
Communication dated Feb. 28, 2018, from Korean Intellectual Property Office in counterpart application No. 10-2017-7015954.

(Continued)

*Primary Examiner* — Edgardo San Martin
(74) *Attorney, Agent, or Firm* — Sughrue Mion, PLLC

(57) ABSTRACT

This invention is concerning a structure body containing inorganic particles having an average particle diameter of 6 mm to 50 mm, and 6 parts by mass to 40 parts by mass of a resin with respect to 100 parts by mass of the inorganic particles.

9 Claims, No Drawings

(56) References Cited

FOREIGN PATENT DOCUMENTS

| | | | |
|---|---|---|---|
| WO | 2008/120909 | A1 | 10/2008 |
| WO | 2013/076601 | A1 | 5/2013 |

OTHER PUBLICATIONS

Communication dated Nov. 1, 2019 from the Indian Patent Office in corresponding Indian Application No. 201737018300.

Communication dated Oct. 22, 2019, from the Taiwanese Intellectual Property Office in application No. 104141733.

Communication dated Mar. 6, 2020, from The China National Intellectual Property Administration in Application No. 201580066801.0.

Zhong Guan et al., "Construction and Management of Computer Room", Shaanxi Science and Technology Press, Jun. 30, 1993, p. 124 (5 pages total).

Kehui Lin, "New Building Materials and Application", China University of Technology Press, Jan. 31, 2006, p. 383 (5 pages total).

* cited by examiner

STRUCTURE BODY, SOUND ABSORBING MATERIAL, SOUND INSULATING WALL MATERIAL, AND MANUFACTURING METHOD OF STRUCTURE BODY

CROSS REFERENCE TO RELATED APPLICATIONS

This application is a National Stage of International Application No. PCT/JP2015/085429, filed on Dec. 11, 2015, which claims priority from Japanese Patent Application No. 2014-251567, filed on Dec. 12, 2014, the contents of all of which are incorporated herein by reference in their entirety.

TECHNICAL FIELD

The present invention relates to a structure body which is produced in a simple way and at a low cost, has excellent sound absorbing performance, and is able to be applied to an architectural structure or a sound insulating wall of a road, a railroad track, a tunnel, and the like, a sound absorbing material formed of the structure body, a sound insulating wall material formed of the sound absorbing material, and a manufacturing method of the structure body.

Priority is claimed on Japanese Patent Application No. 2014-251567, filed Dec. 12, 2014, the content of which is incorporated herein by reference.

BACKGROUND ART

Recently, interest in a living environment has increased, and noise from a neighboring house, a plant, and the like or noise generated from an automobile, a railroad vehicle, and the like have been required to be suppressed. A fiber, a foamed body, a porous body, and the like of an inorganic material are able to be used as a sound absorbing material. But it requires effort at the time of being constructed in a wall or the like, and the sound absorbing material is dissipated after the construction, since the material is a powder. Therefore, various sound absorbing plates have been proposed in which the inorganic particles are molded into the shape of a plate by a resin or the like. For example, in PTL 1, a sound absorbing material pressure molded by using ceramic particles such as mullite is proposed. In addition, in PTL 2, a sound absorbing plate is proposed in which an inorganic particle group having a ratio of particles distributed in a particle diameter of 0.5 mm to 2 mm of greater than or equal to 70 weight % with respect to the total particles is pressure molded into a plate-like body through an adhesive agent.

CITATION LIST

Patent Literature

PTL 1: Japanese Unexamined Patent Application, First Publication No. H5-204385

PTL 2: Japanese Unexamined Patent Application, First Publication No. H10-331286

SUMMARY OF INVENTION

Technical Problem

However, it is assumed that the sound absorbing plate is manufactured in a place where a pressurization device is provided, and thus it is necessary that the sound absorbing plate is transported from a manufacturing place to a construction place after the molding. Therefore, it is necessary that the sound absorbing plate has high mechanical strength capable of withstanding a vibration or an impact during the transportation, and the sound absorbing plate is formed by pressurizing fine particles. Therefore, it is difficult to decrease porosity and to express excellent sound absorbing performance. In addition, the sound absorbing plate having small porosity has a heavy weight, and as a result thereof, construction properties decrease.

The present invention has been made in order to solve the problems described above, and an object of the present invention is to provide a structure body which has excellent sound absorbing properties and light weight, and can be manufactured by a simple step, a sound absorbing material formed of the structure body, a sound insulating wall material formed of the sound absorbing material, and a manufacturing method of the structure body.

Solution to Problem (1) According to an aspect of the present invention, there is provided a structure body containing inorganic particles having an average particle diameter of 6 mm to 50 mm, and 6 parts by mass to 40 parts by mass of a resin with respect to 100 parts by mass of the inorganic particles.

(2) In the structure body according to (1) described above, the structure body may have a plurality of continuous gaps therein which allows one end surface to communicate with the other end surface.

(3) In the structure body according to (1) or (2) described above, bulk specific gravity may be less than or equal to 0.9.

(4) In the structure body according to any one of (1) to (3) described above, an average particle diameter of the inorganic particles may be 6 mm to 20 mm, and 70 mass % or more of the inorganic particle may have an average particle diameter of 6 mm to 20 mm.

(5) In the structure body according to any one of (1) to (4) described above, the inorganic particles may be one or more types of particles selected from the group consisting of natural stone, silica sand, obsidian, pearl stone, Kohga stone, white sand, shale, glass, zeolite, ceramic and a fired foamed body thereof, perlite, pumice stone, scoria, a hollow balloon, and a lightweight aggregate.

(6) In the structure body according to any one of (1) to (5) described above, the resin may be formed by curing a resin composition which contains a thermosetting resin having a viscosity of 0.08 Pa·s to 2 Pa·s, a curing agent, and a curing accelerator.

(7) In the structure body according to (6) described above, the thermosetting resin may be one or more types of resins selected from a group consisting of an unsaturated polyester resin, a vinyl ester resin, a phenol resin, a urea resin, a melamine resin, and an epoxy resin.

(8) According to another aspect of the present invention, there is provided a sound absorbing material formed of the structure body according to any one of (1) to (7) described above.

(9) According to still another aspect of the present invention, there is provided a sound insulating wall material formed of the sound absorbing material according to (8) described above.

(10) According to still another aspect of the present invention, there is provided a manufacturing method of a structure body including a step of mixing inorganic particles having an average particle diameter of 6 mm to 50 mm, and 6 parts by mass to 40 parts by mass of a resin composition with respect to 100 parts by mass of the inorganic particles; and a step of molding the mixed inorganic particles and resin composition without pressuring.

Advantageous Effects of Invention

According to the present invention, it is possible to provide a structure body which has excellent sound absorbing properties and light weight, and is able to be manufactured by a simple step, a sound absorbing material formed of the structure body, a sound insulating wall material formed of the sound absorbing material, and a manufacturing method of the structure body.

DESCRIPTION OF EMBODIMENTS

Hereinafter, a structure body of the present invention, a sound absorbing material formed of the structure body, a sound insulating wall material formed of the sound absorbing material, and a manufacturing method of the structure body will be described in detail. Furthermore, the scope of the present invention is not limited to a specific embodiment described below.

The structure body of the present invention contains inorganic particles having an average particle diameter of 6 mm to 50 mm, and 6 parts by mass to 40 parts by mass of a resin with respect to 100 parts by mass of the inorganic particles.

[Inorganic Particles]

Examples of the material of the inorganic particles used in the present invention include various natural stones, silica sand, obsidian, pearl stone, Kohga stone (Kokaseki), white sand (shirasu), shale, glass, zeolite, various ceramics and a fired foamed body thereof, perlite, pumice stone, scoria, a hollow balloon, a lightweight aggregate, and the like. Among them, a material such as the white sand, the fired foamed body of the various ceramics, the perlite, the pumice stone, the scoria, the hollow balloon, and the lightweight aggregate is preferable for a lightweight of the structure body, a porous material such as the white sand, the pumice stone, and the scoria is more preferable from a viewpoint of sound absorbing properties, and the pumice stone is even more preferable from a viewpoint of ease in acquiring and lightweight properties. The inorganic particles may be independently used, or two or more types thereof may be used by being mixed.

The inorganic particles have an average particle diameter of greater than or equal to 6 mm and less than or equal to 50 mm (6 mm to 50 mm). By setting the average particle diameter of the inorganic particles to be in the range described above, it is possible to have a sufficient pore between the inorganic particles contained in the sound absorbing material of the present invention, and thus excellent sound absorbing performance is expressed. In addition, it is more preferable that the average particle diameter of the inorganic particles is greater than or equal to 6 mm and less than or equal to 30 mm from a viewpoint of moldability of the structure body, and it is even more preferable that the average particle diameter of the inorganic particles is greater than or equal to 7 mm and less than equal to 20 mm from a viewpoint of strength of the structure body. The average particle diameter of the inorganic particles indicates the average value of diameters which are measured from the shortest portions of 30 randomly selected inorganic particles using a vernier caliper.

A particle diameter range of the inorganic particles is preferably greater than or equal to 3 mm and less than or equal to 60 mm, is more preferably greater than or equal to 5 mm and less than or equal to 50 mm, and is even more preferably greater than or equal to 5 mm and less than or equal to 30 mm. It is preferable that inorganic particles having a particle diameter of greater than or equal to 6 mm are contained in the amount of greater than or equal to 70 mass %, it is more preferable that inorganic particles having a particle diameter of greater than or equal to 6 mm and less than or equal to 50 mm are contained in the amount of greater than or equal to 70 mass %, and it is even more preferable that inorganic particles having a particle diameter of greater than or equal to 6 mm and less than or equal to 20 mm are contained in the amount of greater than or equal to 70 mass %, from a viewpoint of the moldability of the structure body.

[Resin]

A thermosetting resin such as an unsaturated polyester resin, a vinyl ester resin, a phenol resin, a urea resin, a melamine resin, and an epoxy resin is preferable as the type of resin included in the resin used in the present invention. Among them, the unsaturated polyester resin, the polyester resin, and the vinyl ester resin are more preferable from a viewpoint of excellent curing properties, and the unsaturated polyester resin is even more preferable from a viewpoint of excellent mechanical strength. The resin may be independently used, or two or e types thereof may be used by being mixed. A polymerizable organic component may be included in addition to the resins described above. The viscosity of the resin is preferably greater than or equal to 0.05 Pa·s and less than or equal to 5 Pa·s (0.05 Pa·s to 5 Pa·s), is more preferably greater than or equal to 0.07 Pa·s and less than or equal to 3 Pa·s, and is particularly preferably greater than or equal to 0.08 Pa·s and less than or equal to 2 Pa·s. By setting the viscosity to be in the range described above, the surface of the inorganic particles is moderately coated at the time of molding the structure body, a contact point between the inorganic particles is fixed by curing a resin composition with sufficient strength, and the resin does not flow and is not biased. Therefore, it is possible to increase sound absorbing performance by ensuring a sufficient pore in the structure body.

Furthermore, the viscosity of the resin used in the present invention, for example, is able to be measured in the following conditions.

Device: TVB-10M (a BM type viscosity meter, manufactured by Toki Sangyo Co., Ltd.)

Measurement Temperature: 25° C.

Rotor: No. 2

Number of Rotations: 60 rpm

Various additives may be added to the resin used in the present invention according to the application and the performance, and may be used as the resin composition. For example, a curing agent, a curing accelerator, a releasing agent, an ultraviolet absorber, a pigment, a viscosity reducer, a plasticizer, a flame retardant, a reinforcement material, a photocuring agent, and the like may be used. These components may be mixed in advance as a component of the resin composition, and may be added immediately before being mixed with the inorganic particles and the resin.

It is preferable that a peroxide is used as the curing agent. For example, a diacyl peroxide-based curing agent, a peroxy ester-based curing agent, a diallyl peroxide-based curing agent, a ketone peroxide-based curing agent, a peroxy ketal-based curing agent, an alkyl perester-based curing agent, a peroxy carbonate-based curing agent, and the like are used, and two or more types thereof may be used together.

Examples of the curing accelerator include cobalt naphthenate, cobalt octenate, copper naphthenate, vanadyl acetylacetate, iron acetylacetate, N,N-dimethyl aniline, and the like.

In addition, a method in which heating is not necessary and the curing is performed at a normal temperature, for example, a method in which the curing agent is mixed into a resin composition containing an accelerator immediately before being molded is preferable as a curing method of the resin composition.

[Structure Body]

The structure body of the present invention contains the resin of greater than or equal to 6 parts by mass and less than or equal to 40 parts by mass with respect to 100 parts by mass of the inorganic particles. Further, the structure body of the present invention has a plurality of continuous gaps (holes) which allows one end surface to communicate with the other end surface, and sufficient porosity is ensured by the plurality of continuous gaps. It is more preferable that the structure body of the present invention contains the resin of 10 parts by mass to 40 parts by mass with respect to 100 parts by mass of the inorganic particles from a viewpoint of ensuring porosity.

In addition, it is preferable that a mixing ratio of the inorganic particles and the resin is suitably adjusted according to the average particle diameter of the inorganic particles from a viewpoint of ensuring a plurality of continuous gaps having sufficient porosity in the structure body. That is, it is preferable that the added amount of the resin with respect to 100 parts by mass of the inorganic particles having an average particle diameter of greater than or equal to 6 mm and less than or equal to 15 mm is greater than or equal to 8 parts by mass and less than or equal to 40 parts by mass, and it is more preferable that the added amount of the resin with respect to 100 parts by mass of the inorganic particles having an average particle diameter of greater than or equal to 10 mm is 35 parts by mass. In addition, the added amount of the resin with respect to 100 parts by mass of the inorganic particles having an average particle diameter of greater than or equal to 15 mm and less than or equal to 50 mm is preferably greater than or equal to 6 parts by mass and less than or equal to 2.5 parts by mass, and is more preferably greater than or equal to 6 parts by mass and less than or equal to 20 parts by mass. Furthermore, bulk specific gravity is determined by a method used in the following examples.

The bulk specific gravity of the structure body of the present invention is preferably less than or equal to 0.9, is more preferably less than or equal to 0.75 from a viewpoint of lightweight properties, and is even more preferably less than or equal to 0.5 from a viewpoint of construction properties. In addition, it is preferable that the bulk specific gravity is greater than or equal to 0.05 from a viewpoint of the strength of the structure body.

The structure body of the present invention has the plurality of continuous gaps and sufficiently large porosity, and thus has a light weight and excellent sound absorbing properties. Accordingly, the structure body of the present invention can be preferably used as a sound absorbing material and the material of a sound insulating wall formed of the sound absorbing material.

[Manufacturing Method of Structure Body]

A manufacturing method of a structure body of the present invention is a simple method in which inorganic particles having an average particle diameter of greater than or equal to 6 mm and less than or equal to 50 mm, and a resin or a resin composition of greater than or equal to 6 parts by mass and less than or equal to 40 parts by mass with respect to 100 parts by mass of the inorganic particles are mixed by a mixer or manually, and the mixture is molded by being poured into a die or by being directly applied on a wall surface or a road surface without pressurization. In the manufacturing method of a structure body of the present invention, the mixture of the resin composition and the inorganic particles can be molded only by being poured into a die and cured. Therefore, a pressurization treatment before molding is not necessary, and thus it is not necessary to use a special pressure molding device or the like, and it is possible to immediately perform construction in the site (a place where the structure body is finally disposed).

The shape of the structure body of the present invention is not particularly limited. That is, the structure body may be in the shape of a flat plate or may be in a shape having concavities and convexities or a curved surface. The thickness of the structure body is not particularly limited, but is preferably greater than or equal to the particle diameter of the inorganic particles.

Furthermore, in order to increase mechanical strength, it is preferable that in the structure body of the present invention, as necessary, metal wire, a reinforcement bar and/or a fiber reinforcement resin material are disposed on the surface of upper and lower surface layers of the structure body as a reinforcement layer. In addition, the structure body may be independently used, or may be used by being combined with other structure materials or a sound absorbing structure member. For example, the structure body is used as a back plate of the sound absorbing structure member, and thus it is possible to further increase sound absorbing properties of the sound absorbing structure member.

EXAMPLES

Hereinafter, the present invention will be described in more detail with reference to Examples 1 to 5 and Comparative Examples 1 to 3, but the present invention is not limited to the following examples.

In Examples 1 to 3, and 5, and Comparative Examples 1 to 3, an unsaturated polyester resin, specifically, a condensate (viscosity of 0.15 Pa·s) of dicyclopentadiene, a maleic acid anhydride, and propylene glycol was used as the resin used in the resin composition.

In addition, in Example 4, a vinyl ester resin, specifically, epoxy methacrylic acid ester (viscosity of 0.16 Pa·s) was used as the resin used in the resin composition. In the resin composition, 0.5 parts by mass of cobalt naphthenate was added with respect to 100 parts by mass of each of the resins, and was mixed until a uniform mixture was obtained, and then 2 parts by mass of a solution of methyl ethyl ketone peroxide of 55% (Permek N, manufactured by NOF CORPORATION) was added and mixed.

In Examples 1 to 4, and Comparative Examples 2 and 3, pumice stone A (an average particle diameter of 8 mm, a particle diameter range of greater than or equal to 6 mm and less than or equal to 15 mm, and a bulk specific gravity of 0.35) was used as the inorganic particles, in Comparative Example 1, pumice stone B (an average particle diameter of 3 mm, a particle diameter range of greater than or equal to 2 mm and less than or equal to 5 mm, and a bulk specific gravity of 0.48) was used as the inorganic particles, and in Example 5, scoria (an average particle diameter of 7 mm, a particle diameter range of greater than or equal to 6 mm and less than or equal to 12 mm, and a bulk specific gravity of 0.72) was used as the inorganic particles.

The resin composition and the inorganic particles were mixed at a blending ratio shown in Table 1, the mixture was poured into a wooden frame of 50 cm×50 cm×a height of 20 cm, the amount of mixture was adjusted such that thickness became 2 cm after smoothing the surface, and the mixture was allowed to stand at normal temperature without being pressurized and was molded. The inorganic particles were fixed by the resin composition after approximately 10 minutes, were demolded at the time of being in the shape of a plate except for Comparative Example 3, were allowed to stand at 25° C. for 24 hours, and were completely cured. Therefore, a structure body was obtained. Furthermore, in Comparative Example 3, the surface of the pumice stone was not able to be sufficiently covered with the resin, and sufficient adhesion between the pumice stones was not obtained. Therefore, the pumice stone was not able to be molded into the shape of a plate. The structure bodies obtained in Examples 1 to 5 and Comparative Examples 1 and 2 were evaluated by the following method, and each of the evaluation results is shown in Table 1.

(Evaluation of Presence or Absence of Continuous Gap)

The obtained structure body was horizontally arranged, water was poured from an upper surface of the structure body, and the presence or absence of a plurality of continuous gaps was determined by whether or not water was leaked from the opposite surface (a lower surface).

(Calculation of Bulk Specific Gravity of Structure Body)

The bulk specific gravity of the structure body was calculated by measuring the mass and the external dimensions of the obtained structure body, and by dividing the mass by the volume.

(Evaluation of Sound Absorbing Ratio)

A sound absorbing ratio in a reverberation room of the obtained structure body was measured in the following conditions on the basis of JIS A 1409.

Four structure bodies were paved on the floor in a range of 1 m×1 m with a thickness of 2 cm. Pink noise was used as noise, and a volume was measured in a reverberation room of 317.4 cubic meters.

Comparative Example 1 has a small average particle diameter of the inorganic particles, and thus a pore between the inorganic particles is embedded in the resin composition, a continuous gap is not obtained, and sound absorbing properties deteriorate. In addition, in the structure body of Comparative Example 2, a large amount of resin composition is used, and thus a pore between the inorganic particles is embedded in the resin composition, a continuous gap is not obtained, and sound absorbing properties deteriorate. In addition, in the structure body of Comparative Example 3, the amount of resin was not sufficient, and as described above, the structure body was not able to be molded into the shape of a plate.

As described above, according to the present invention, it is possible to provide a structure body which has excellent sound absorbing properties and light weight, and is able to be manufactured by a simple step. The structure body of the present invention is able to be immediately constructed in a construction site, and is easily attached to an outside wall or the like. Therefore, various noises are able to be reduced by widely using the structure body in various plants, a railroad, a road, a tunnel, a bridge, an outside wall of a building facing a road, a planting basin, and the like as a sound absorbing material.

The invention claimed is:

1. A structure body consisting of inorganic particles having an average particle diameter of 6 mm to 20 mm, and 6 parts by mass to 40 parts by mass of a resin with respect to 100 parts by mass of the inorganic particles, wherein the inorganic particles are porous materials, and 70 mass % or more of the inorganic particles have an average particle diameter of 6 mm to 20 mm.

2. The structure body according to claim 1, wherein the structure body has a plurality of continuous gaps therein which allows one end surface to communicate with the other end surface.

3. The structure body according to claim 1, wherein bulk specific gravity is less than or equal to 0.9.

TABLE 1

| | | | Example 1 | Example 2 | Example 3 | Example 4 | Example 5 | Comparative Example 1 | Comparative Example 2 | Comparative Example 3 |
|---|---|---|---|---|---|---|---|---|---|---|
| Inorganic Particles | | | Pumice Stone A | Pumice Stone A | Pumice Stone A | Pumice Stone A | Scoria | Pumice Stone B | Pumice Stone A | Pumice Stone A |
| Average Particle Diameter of Inorganic Particles (mm) | | | 8 | 8 | 8 | 8 | 7 | 3 | 8 | 8 |
| Added Amount (Parts by Mass) | Inorganic Particles | | 100 | 100 | 100 | 100 | 100 | 100 | 100 | 100 |
| | Unsaturated Polyester Resin Composition | | 25 | 10 | 35 | — | 25 | 25 | 50 | 5 |
| | Vinyl Ester Resin Composition | | — | — | — | 25 | — | — | — | — |
| Presence or Absence of Continuous Gap (Present: ○, Absent: x) | | | ○ | ○ | ○ | ○ | ○ | x | x | *1 |
| Bulk Specific Gravity (g/cm$^3$) | | | 0.40 | 0.35 | 0.43 | 0.40 | 0.77 | 0.80 | 0.48 | |
| Sound Absorbing Ratio (—) | Center Frequency (Hz) | 500 | 0.67 | 0.61 | 0.50 | 0.64 | 0.41 | 0.18 | 0.24 | |
| | | 1000 | 0.65 | 0.71 | 0.54 | 0.68 | 0.62 | 0.25 | 0.35 | |
| | | 2000 | 0.26 | 0.20 | 0.26 | 0.20 | 0.19 | 0.09 | 0.11 | |

*1: Incapable of Being Molded into Shape of Plate

According to the results described above, the structure bodies of Examples 1 to 5 have a plurality of continuous gaps and high sound absorbing performance over a wide range of frequencies. In contrast, the structure body of

4. The structure body according to claim 1, wherein the inorganic particles are one or more types of particles selected from the group consisting of white sand, pumice stone, and scoria.

5. The structure body according to claim 1, wherein the resin is formed by curing a resin composition which contains a thermosetting resin having a viscosity of 0.08 Pa·s to 2 Pa·s, a curing agent, and a curing accelerator.

6. The structure body according to claim 5, wherein the thermosetting resin is one or more types of resins selected from the group consisting of an unsaturated polyester resin, a vinyl ester resin, a phenol resin, a urea resin, a melamine resin, and an epoxy resin.

7. A sound absorbing material formed of the structure body according to claim 1.

8. A sound insulating wall material formed of the sound absorbing material according to claim 7.

9. A manufacturing method of a structure body, comprising:

a step of mixing inorganic particles having an average particle diameter of 6 mm to 20 mm, and 6 parts by mass to 40 parts by mass of a resin composition with respect to 100 parts by mass of the inorganic particles; and a step of molding the mixed inorganic particles and resin composition without pressuring, wherein the inorganic particles are porous materials, 70 mass % or more of the inorganic particles have an average particle diameter of 6 mm to 20 mm, and the structure body consists of the inorganic particles and the resin composition.

* * * * *